United States Patent
Kang et al.

(10) Patent No.: US 11,614,882 B2
(45) Date of Patent: Mar. 28, 2023

(54) OPERATING METHOD OF MEMORY CONTROLLER TO REDUCE LIFESPAN DAMAGE, OPERATING METHOD OF HOST AND STORAGE DEVICE

(71) Applicant: Samsung Electronics Co., Ltd., Suwon-si (KR)

(72) Inventors: Kyung Mun Kang, Busan (KR); Hyung-Kyun Byun, Yongin-si (KR); Seon Woo Kim, Incheon (KR); Jin Won Kim, Seoul (KR); Young Joon Jang, Hwaseong-si (KR); Jeong-Su Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 32 days.

(21) Appl. No.: 17/194,588

(22) Filed: Mar. 8, 2021

(65) Prior Publication Data
US 2021/0397367 A1 Dec. 23, 2021

(30) Foreign Application Priority Data
Jun. 19, 2020 (KR) .................. 10-2020-0075084

(51) Int. Cl.
*G06F 3/06* (2006.01)
*G06F 12/02* (2006.01)
(52) U.S. Cl.
CPC .......... *G06F 3/0655* (2013.01); *G06F 3/0604* (2013.01); *G06F 3/0679* (2013.01); *G06F 12/0253* (2013.01); *G06F 2212/7205* (2013.01)

(58) Field of Classification Search
None
See application file for complete search history.

(56) References Cited

U.S. PATENT DOCUMENTS

| | | |
|---|---|---|
| 8,312,207 B2 | 11/2012 | Merry, Jr. et al. |
| 9,690,700 B2 | 6/2017 | Choi et al. |
| 9,778,878 B2 | 10/2017 | Hodgdon et al. |
| 10,198,194 B2 | 2/2019 | Colgrove et al. |
| 10,534,716 B2 | 1/2020 | Jannyavula Venkata et al. |
| 2010/0082930 A1 | 4/2010 | Jiva et al. |
| 2011/0185112 A1* | 7/2011 | Goss .................. G06F 12/0246 711/E12.001 |

(Continued)

FOREIGN PATENT DOCUMENTS

| | | |
|---|---|---|
| KR | 2015-0106777 A | 9/2015 |
| KR | 1631409 B1 | 6/2016 |

OTHER PUBLICATIONS

European Office Action dated Sep. 3, 2021 for EP Application No. 21 159 564.0.

(Continued)

*Primary Examiner* — Jane W Benner
(74) *Attorney, Agent, or Firm* — Harness, Dickey & Pierce, P.L.C.

(57) ABSTRACT

An operating method of a memory controller may include receiving a state analysis request of a memory from a host, determining a fragment state of the memory, determining a lifespan situation of the memory, generating an analysis result indicating whether a garbage collection is restricted, on the basis of the fragment state and the lifespan situation, and providing the analysis results to the host.

15 Claims, 14 Drawing Sheets

(56) References Cited

U.S. PATENT DOCUMENTS

| | | | |
|---|---|---|---|
| 2015/0261452 A1* | 9/2015 | Moon | G06F 3/0679 |
| | | | 711/103 |
| 2015/0268872 A1* | 9/2015 | Ding | G06F 3/0616 |
| | | | 711/103 |
| 2015/0324282 A1 | 11/2015 | Seekins et al. | |
| 2018/0107593 A1* | 4/2018 | Ogawa | G06F 13/10 |
| 2018/0196619 A1 | 7/2018 | Ogawa | |
| 2019/0179747 A1* | 6/2019 | Kim | G06F 12/0253 |
| 2019/0347197 A1 | 11/2019 | Lee et al. | |
| 2020/0104254 A1 | 4/2020 | Lee | |

OTHER PUBLICATIONS

European Search Report dated Aug. 23, 2021 for EP Application No. 21 15 9564.

\* cited by examiner

OPERATING METHOD OF MEMORY CONTROLLER TO REDUCE LIFESPAN DAMAGE, OPERATING METHOD OF HOST AND STORAGE DEVICE

This application claims priority from Korean Patent Application No. 10-2020-0075084 filed on Jun. 19, 2020 in the Korean Intellectual Property Office, the disclosure of which is incorporated herein by reference in its entirety.

BACKGROUND

1. Field

Example embodiments relate to an operating method of a memory controller, an operating method of a host, and/or a storage device.

2. Description of the Related Art

A storage device may perform a garbage collection to improve a fragment state of a memory block by moving valid data in the memory block and erasing the memory block to secure a free block, when the invalid data in the memory block increases.

The garbage collection may be performed at the request of a host (that is, a host-initiated garbage collection). For example, if the storage device becomes overly fragmented and a performance degradation occurs, the host may request the garbage collection on the storage device to restore performance.

Incidentally, although a frequent garbage collection may secure a lot of free blocks and improve the performance of the storage device, because the number of times the erase operation is also performed increases, a lifespan damage to the storage device may occur.

SUMMARY

At least some example embodiments provide an operating method of a memory controller that inhibits (or, alternatively, prevents) excessive occurrence of host-initiated garbage collection to reduce (or, alternatively, minimize) lifespan damage to the storage device.

At least some example embodiments also provide a storage device that inhibits (or, alternatively, prevents) excessive occurrence of host-initiated garbage collection to reduce (or, alternatively, minimize) lifespan damage to the storage device.

At least some example embodiments also provide an operating method of a host that inhibits (or, alternatively, prevents) excessive occurrence of host-initiated garbage collection to reduce (or, alternatively, minimize) lifespan damage to the storage device.

However, example embodiments are not restricted to the one set forth herein. The and other example embodiments will become more apparent to one of ordinary skill in the art to which the present disclosure pertains by referencing the detailed description of the present disclosure given below.

According to an example embodiment of the present disclosure, a method of operating a memory controller may include receiving a state analysis request of a memory from a host; determining a fragment state of the memory; determining a lifespan situation of the memory; generating an analysis result indicating whether a garbage collection is restricted, based on at least one of the fragment state and the lifespan situation; and providing the analysis result to the host.

According to an example embodiment of the present disclosure, a method of operating a memory controller may include receiving a first state analysis request of a memory from a host; providing a first analysis result of the memory to the host, in response to the first state analysis request; receiving a first garbage collection execution request of the memory from the host; performing a garbage collection operation on a first memory region of the memory, the first memory region being a first size; receiving a second state analysis request of the memory from the host; providing a second analysis result of the memory to the host, in response to the second state analysis request; receiving a second garbage collection execution request of the memory from the host; and performing the garbage collection operation on a second memory region of the memory, the second memory region being a second size different from the first size of the first memory region.

According to an example embodiment of the present disclosure, a method of operating a memory controller may include receiving a state analysis request of a memory from a host; determining a fragment state of the memory; calculating an expected lifespan of the memory based on a WAF (Write Amplification Factor), in response to the fragment state of the memory being above a fragmentation threshold; determining whether the expected lifespan fulfills a desired lifespan; determining whether a host write count is within a restriction section, in response to the expected lifespan of the memory not fulfilling the desired lifespan; generating an analysis result indicating that a garbage collection is restricted, in response to the host write count being within the restriction section; and providing the host with fragmentation information and the analysis result, the fragmentation information indicating the fragment state of the memory.

According to an example embodiment of the present disclosure, a storage device may include a memory; and a memory controller configured to, analyze a fragment state and a lifespan situation of the memory based on a state analysis request from a host, and generate an analysis result indicating whether a garbage collection of the memory is restricted based on at least one of the fragment state or the lifespan situation.

According to an example embodiment of the present disclosure, a method of operating a host may include requesting a storage device to perform a first state analysis of a memory included in the storage device; and receiving, from the memory, a first fragmentation information indicating that the memory is fragmented and a first analysis result indicating that execution of a garbage collection on the memory is restricted, in response to the first state analysis.

BRIEF DESCRIPTION OF THE DRAWINGS

The and other aspects and features of the present disclosure will become more apparent by describing in detail example embodiments thereof referring to the attached drawings, in which.

DETAILED DESCRIPTION

Hereinafter, various example embodiments of the present disclosure will be described referring to the accompanying drawings.

Figure 1:
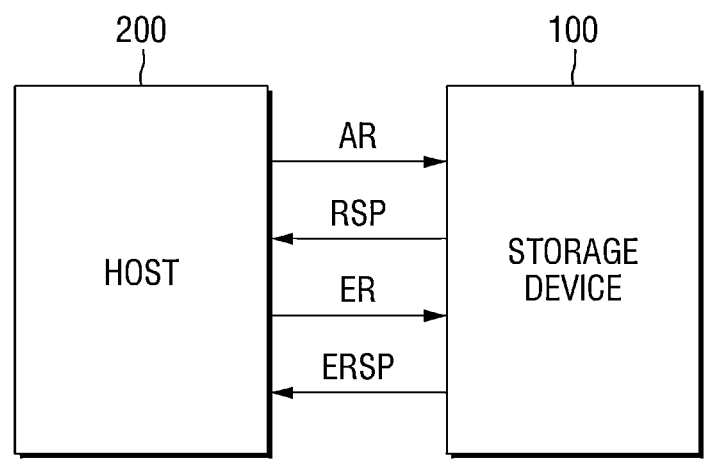
FIG. 1 is a block diagram for explaining an operating method of a memory controller according to some example embodiments of the present disclosure.
Figure 2:
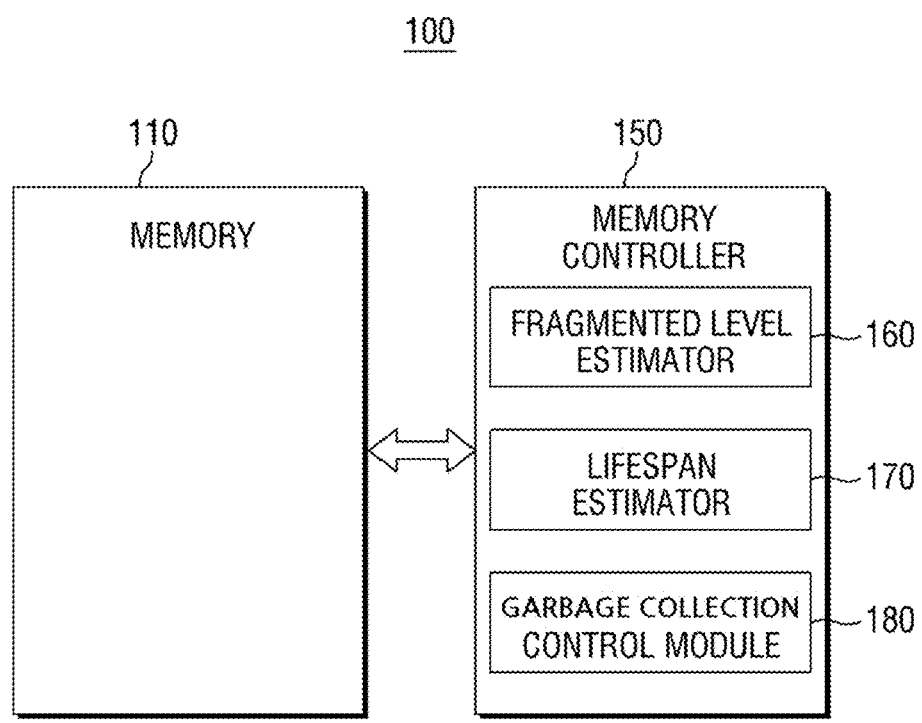
FIG. 2 is an example block diagram for explaining the memory controller of FIG. 1.

FIG. 1 is a block diagram for explaining an operating method of a memory controller according to some embodiments of the present disclosure. FIG. 2 is an example block diagram for explaining the memory controller of FIG. 1.

First, referring to FIG. 1, a host 200 and a storage device 100 are electrically connected to each other, and the storage device 100 may operate at the request of the host 200.

The host 200 provides the storage device 100 with a state analysis request AR of the memory installed in the storage device 100.

The storage device 100 analyzes the state of the memory and provides the host 200 with an analysis result RSP indicating whether a garbage collection is restricted.

Analyzing the state of memory may include, for example, determination/analysis of the fragment state of memory and the lifespan situation of the memory.

Here, the analysis result RSP may include, for example, "required", "non-required", and "restrict". "Required" means that fragmentation of memory increases and garbage collection is required, and "non-required" means that fragmentation of memory is below a reference, and garbage collection is not required. "Restrict" means that fragmentation of memory increases, but a garbage collection execution is restricted for other reasons (e.g., a lifespan damage). The analysis result RSP is not restricted to the required, non-required and restrict, and may be expressed in other forms. Also, the restrict reason may be indicated as "restrict by lifespan".

Also, when the storage device 100 provides the analysis result RSP to the host 200, at least one of the fragment state and the lifespan situation may be provided together.

Here, the fragment state may only indicate whether the memory is fragmented, and may also indicate fragment steps (e.g., one of steps 1 to 5). The fragment state may also be indicated in color and may be indicated as Yes/No or I/O.

Also, the lifespan situation may also indicate only whether the lifespan situation is good/bad, and may indicate a bad step (e.g., one of steps 1 to 5). The lifespan situation may also be indicated in color, and may be indicated as Yes/No, 1/0.

Further, depending on the design, not only the fragment state and the lifespan situation, but also a host write count or a WAF (Write Amplification Factor) may be further provided to the host 200.

The host 200 may receive the analysis result RSP, and provide the garbage collection execution request ER to the storage device 100, referring to the analysis result RSP. The host 200 may, but is not restricted to, provide the garbage collection execution request ER only when the analysis result RSP is "required".

The storage device 100 may perform the garbage collection in response to the garbage collection execution request ER, and provide the result ERSP thereof to the host 200. The garbage collection result ERSP may be, for example, "completed" or "suspended". "Completed" means that the garbage collection execution is completed, and "suspended" means that another request (e.g., a write) is input from the host 200 while executing the garbage collection, and the garbage collection is suspended. The analysis result RSP is not restricted to completed, suspended and the like, and may be expressed in other forms.

Referring to FIG. 2, the storage device 100 may include a memory 110 and a memory controller 150. The memory 110 and the memory controller 150 are electrically connected to each other, and the memory 110 operates according to the instructions of the memory controller 150 and provides the operation result to the memory controller 150.

The memory controller 150 may be implemented using processing circuitry such as hardware including logic circuits, a hardware/software combination such as a processor executing software; or a combination thereof. For example, while the processing circuitry is illustrated as being a CPU, the processing circuitry may include, but is not limited to, a CPU, an arithmetic logic unit (ALU), a digital signal processor, a microcomputer, a field programmable gate array (FPGA), a System-on-Chip (SoC) a programmable logic unit, a microprocessor, or an application-specific integrated circuit (ASIC), etc.

The processing circuitry included in the memory controller 150 may be configured as a special purpose computer through, for example, logic circuits or a processor executing software to perform the functions of a fragmented level estimator 160, a lifespan estimator 170 and a garbage collection control module 180.

The fragmented level estimator 160 is a module that estimates/determines the fragment state of the memory 110. For example, the percentage of invalid data in the memory block may be considered. It is also possible to measure the number of invalid data in the memory block and determine whether the measured number exceeds a reference value. If the measured number exceeds the reference value, it is possible to determine that the memory block is fragmented.

The lifespan estimator 170 is a module that estimates/determines the lifespan situation of the memory 110. The lifespan estimator 170 estimates how long the memory block may be used, for example, if the memory block is used by substantially the same tend (or in substantially the same way) as at the determination time point. It is determined whether the expected lifespan may satisfy a desired lifespan (or guaranteed lifespan) in this way. For example, the expected lifespan estimated by the lifespan estimator 170 is 70 TBW (Total Byte Written), but the guaranteed lifespan may be 100 TBW. In such a case, the lifespan estimator 170 may determine that the expected lifespan of the memory 110 does not fulfill the desired lifespan.

The garbage collection control module 180 is a module that controls the garbage collection operation of the memory 110. Specifically, the garbage collection control module 180 may control the memory 110 to perform the garbage collection operation at the request of the host 200. Further, the garbage collection control module 180 may generate the analysis result RSP of current state of the memory 110, on the basis of the fragment state determined by the fragmented level estimator 160 and the lifespan situation determined by the lifespan estimator 170. The analysis result RSP may be required, non-required, restrict, etc., as described above.

The storage device 100 may be, but is not restricted to, one of an eMMC (embedded multimedia card), a UFS (universal flash storage) or a SSD (solid state drive).

Figure 3:
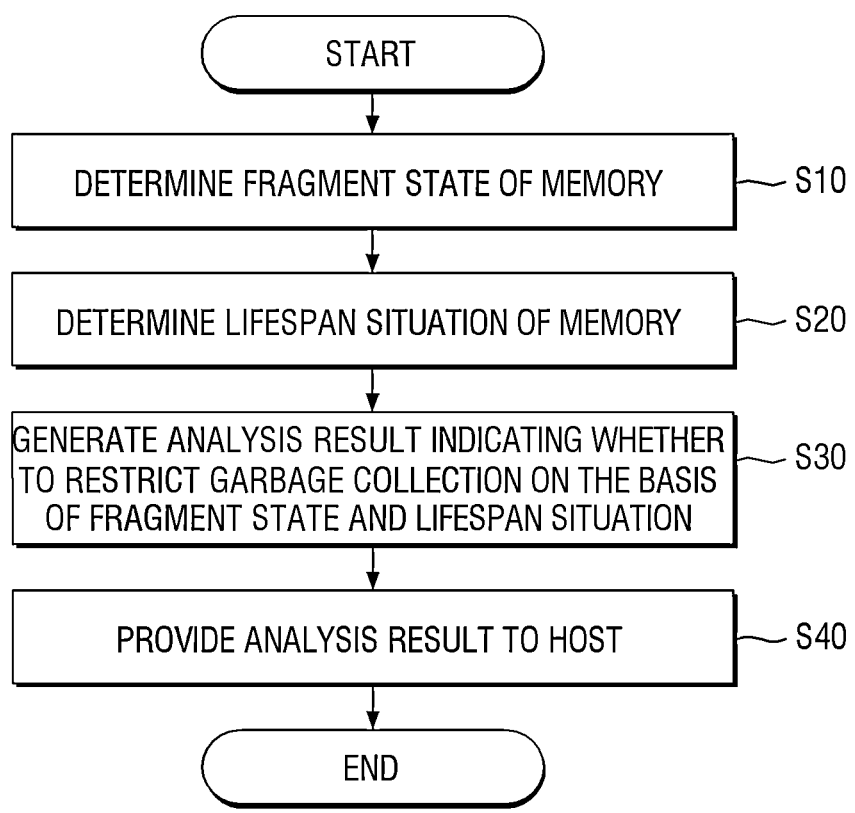
FIG. 3 is a flowchart for explaining an operating method of the memory controller according to some example embodiments of the present disclosure.

FIG. 3 is a flowchart for explaining an operating method of a memory controller according to some example embodiments of the present disclosure.

Referring to FIG. 3, the host 200 makes the state analysis request AR to the storage device 100 to check on how the memory state of the storage device 100 is, before requesting the storage device 100 to perform the garbage collection operation.

In operation S10, the memory controller 150 determines the fragment state of memory when receiving the state analysis request AR from the host 200.

In operation S20, the memory controller 150 determines the lifespan situation of the memory is determined.

In operation S30, the memory controller 150 generates an analysis result RSP indicating whether the garbage collection is restricted, on the basis of the determined fragment state and lifespan situation.

Specifically, if the memory is fragmented and the memory controller 150 determines that the expected lifespan of memory does not fulfill the desired lifespan, the analysis results indicating whether the garbage collection is restricted may be generated, in further consideration of the host write count. Here, further consideration of the host write count includes determining whether the host write count is within a restriction section. If the host write count is within the restriction section, an analysis result that restricts the garbage collection is generated, and if the host write count is outside the restriction section, an analysis result that requires garbage collection is generated. The size of the restriction section may change depending on the expected lifespan of memory.

On the other hand, if the memory controller 150 determines that the memory is not fragmented, the memory controller 150 may generate an analysis result indicating that no garbage collection is required.

In operation S40, the memory controller 150 provides the analysis results RSP to the host. At least one of the determined fragment state and lifespan situation may be additionally provided to the host.

Figure 4:
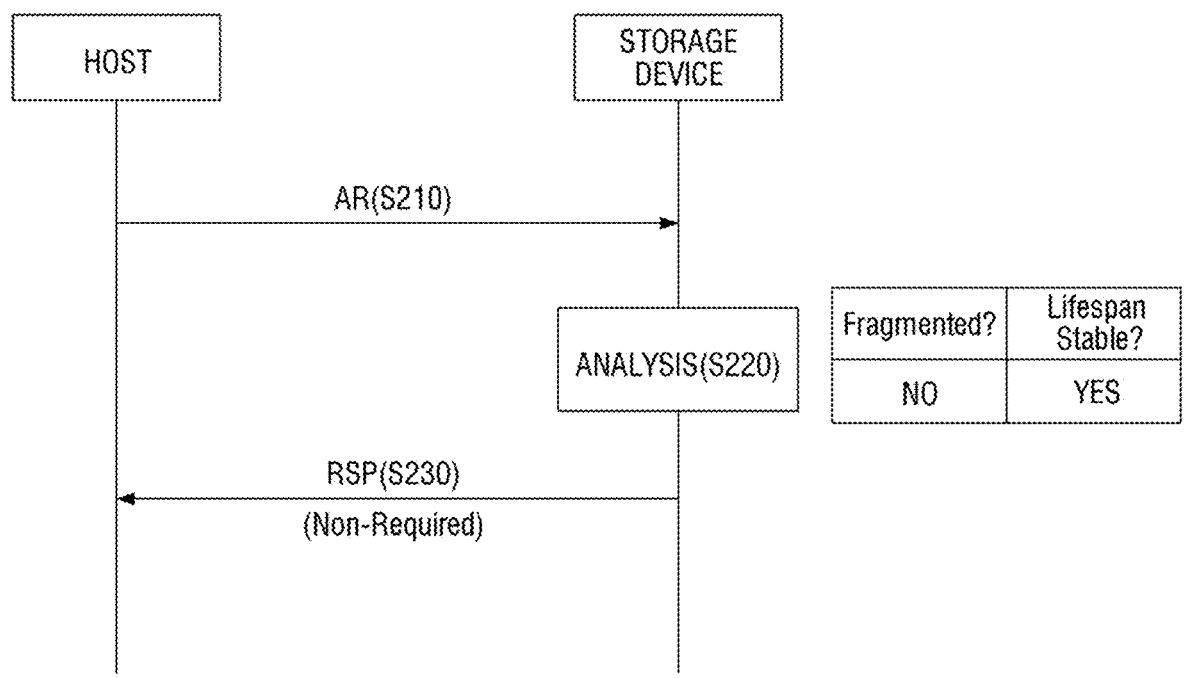
FIGS. 4 and 5 are diagrams for explaining an operating method of the memory controller according to a first example embodiment of the present disclosure.
Figure 5:
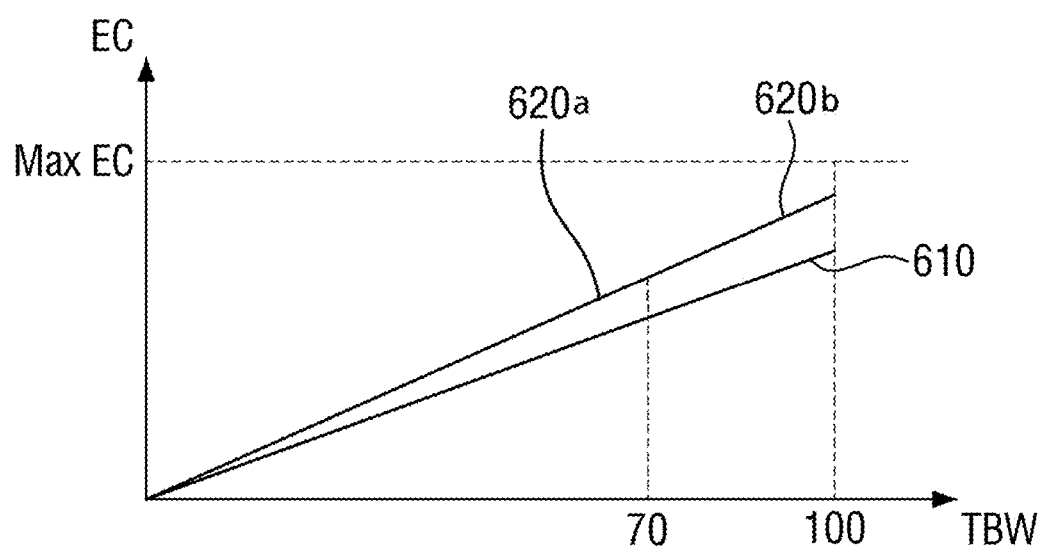

FIGS. 4 and 5 are diagrams for explaining an operating method of the memory controller according to the first example embodiment of the present disclosure. In particular, FIGS. 4 and 5 explain a case where the analysis result is non-required.

Referring to FIG. 4, in operation S210, the host 200 provides the storage device 100 with a state analysis request AR of the memory.

Subsequently, in operation S220, the storage device 100 determines the fragment state of memory in response to the state analysis request AR, and determines the lifespan situation of memory.

As described above, the fragment state may be determined in consideration of the ratio of invalid data in the memory block.

The lifespan situation may be determined by estimating how long the memory block may be further used, when the memory block is used by substantially the same tend as the determination time point.

Specifically, referring to FIG. 5, an x-axis is a TBW (Total Byte Written), and a y-axis means an EC (erase count). When the number of erases of the memory block reaches a maximum EC (Max EC), the memory controller 150 may determine that the memory block has reached the end of its lifespan. It is assumed that the current state of memory is 70 TBW and the expected lifespan (guaranteed lifespan) is 100 TBW.

Reference numeral 610 is a reference lifeline, and reference numerals 620a and 620b together mean a real lifeline of the memory block.

The reference lifeline 610 and the real lifeline 620a, 620b take a WAF (Write Amplification Factor) into consideration. The memory performs an additional write operation for other reasons (e.g., garbage collection etc.), in addition to the write by write request of the host 200. The WAF may be defined as "an actual written amount/an amount of write requested by the host". If the WAF is 1, it means that there is no non-required write operation other than the write request of the host 200. Therefore, it is determined that, as WAF approaches 1, an efficient write operation is performed.

A slope of the reference lifeline 610 is estimated in consideration of a reasonable WAF. Referring to the reference lifeline 610, it may be confirmed that the number of erases does not reach Max EC even if the write size reaches 100 TBW.

A slope of a section 620a corresponding to the write size 0 to 70 TBW in the real lifeline 620a, 620b may be calculated on the basis of the way in which the memory is actually used. To explain in another way, the section 620a corresponding to the write size 0 to 70 TBW in the real lifeline 620a, 620b reflects the real WAF.

Also, a section 620b corresponding to the write size 70 to 100 TBW in the real lifeline 620a, 620b is estimated through, for example, extrapolation assuming a case of being used with substantially the same tend as the determination time point (that is, 70 TBW) (that is, with substantially the same slope as the slope between 0 and 70 TBW).

The method for estimating the real lifeline 620a, 620b may use, for example, but is not limited to, a regression analysis.

Referring to the real lifeline 620a, 620b, although the real lifeline 620a, 620b has a steeper slope than the reference lifeline 610, it may be confirmed that the number of erases does not reach Max EC even if the write size reaches 100 TBW.

Referring again to FIG. 4, based on the data generated with reference to FIG. 5 as a result in which the storage device 100 performs the state analysis of the memory at the request of the host 20, the storage device 100 determines that the fragment state is non-fragmented (NO), and the lifespan situation is good (YES).

Subsequently, in operation S230, the storage device 100 generates an analysis result RSP on the basis of the fragment state and the lifespan situation, and provides it to the host 200. The analysis results RSP indicate non-required of garbage collection, because the memory was not fragmented.

Figure 6:
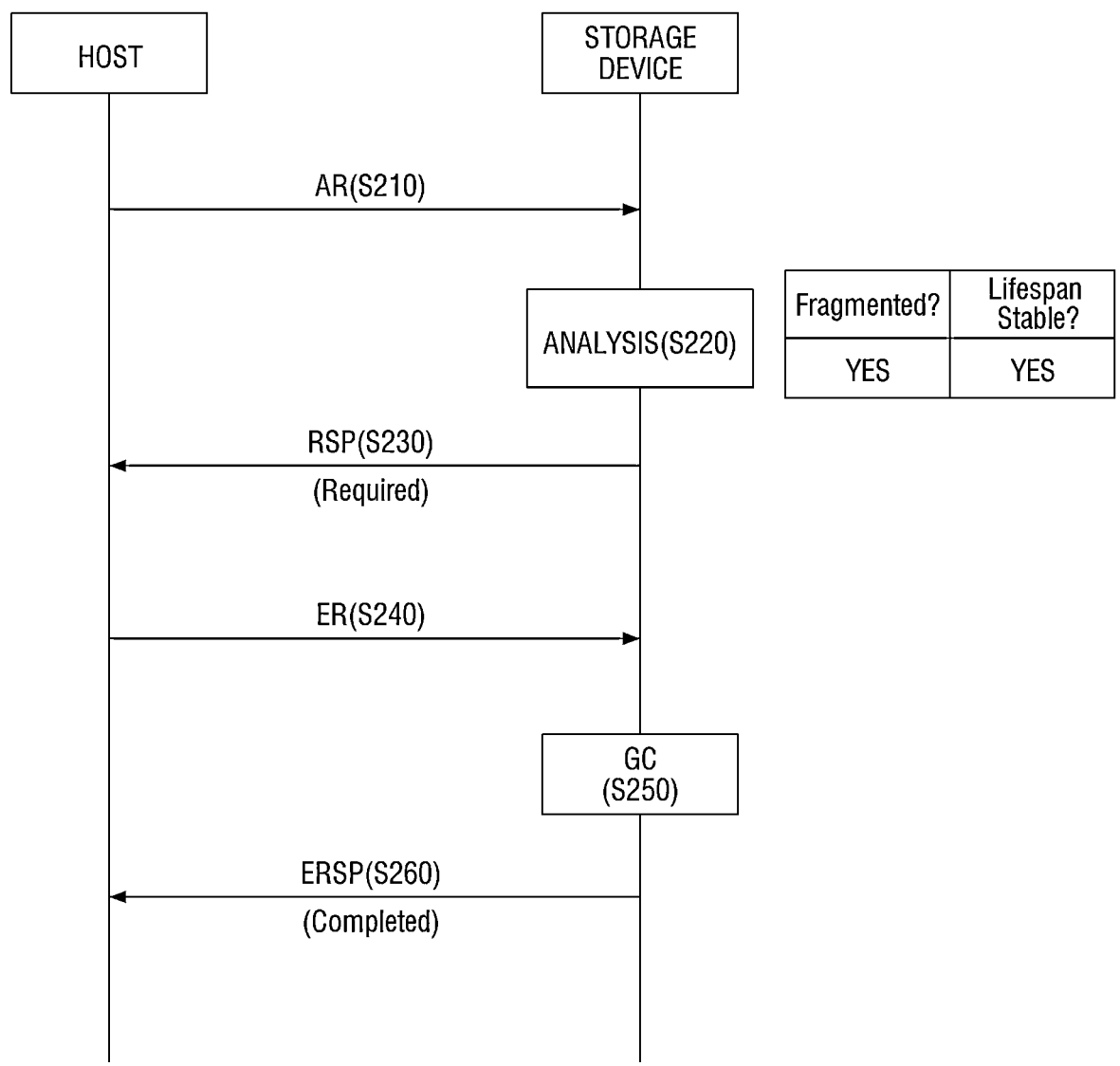
FIG. 6 is a diagram for explaining an operating method of the memory controller according to a second example embodiment of the present disclosure.

FIG. 6 is a diagram for explaining an operating method of a memory controller according to a second example embodiment of the present disclosure. In particular, FIG. 6 explains a case where the analysis result is required. For convenience of explanation, points different from those explained using FIGS. 4 and 5 will be mainly explained.

Referring to FIG. 6, in operation S210, the host 200 provides the storage device 100 with a state analysis request AR of the memory.

Subsequently, in operation S220, the storage device 100 determines the fragment state of memory in response to the state analysis request AR, and determines the lifespan situation of the memory. As a result of the state analysis of the memory, for example, the state analysis discussed with reference to FIG. 5 but with different Total Byte Written, Erase Counts and/or Write Amplification Values, the fragment state was fragmented (YES), and the lifespan situation was analyzed as good (YES).

Subsequently, in operation S230, the storage device 100 generates an analysis result RSP on the basis of the fragment state and the lifespan situation, and provides it to the host 200. The analysis results RSP indicate that garbage collection is required, because the memory is fragmented and the lifespan situation is also good.

Subsequently, in operation S240, the host 200 confirms the analysis result RSP and provides a garbage collection execution request ER.

Subsequently, in operation S250, the storage device 100 performs the garbage collection GC.

In operation S260, the storage device 100 provides the host 200 with a garbage collection result ERSP indicating that the garbage collection GC is completed.

Figure 7:
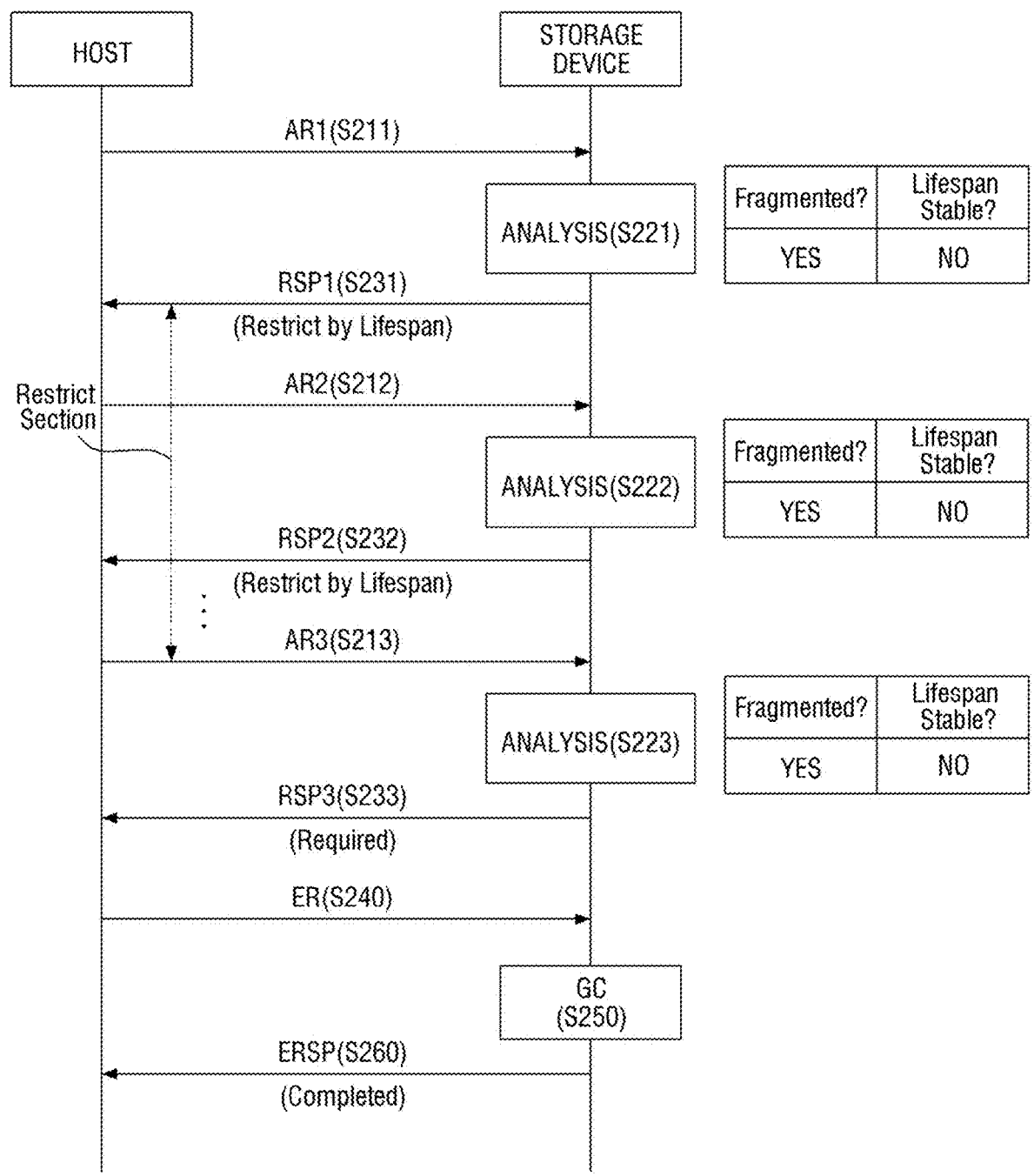
FIGS. 7 to 9 are diagrams for explaining an operating method of the memory controller according to a third example embodiment of the present disclosure.
Figure 8:
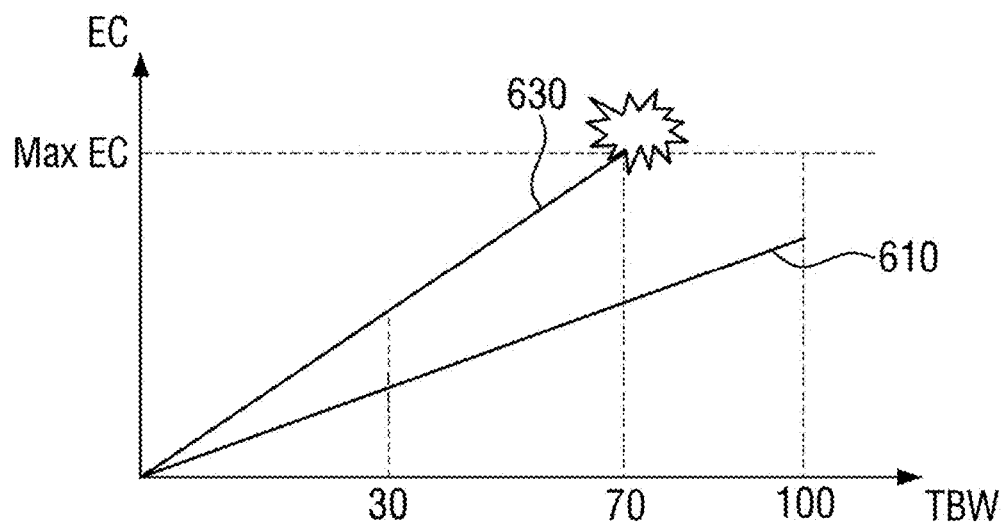
Figure 9:
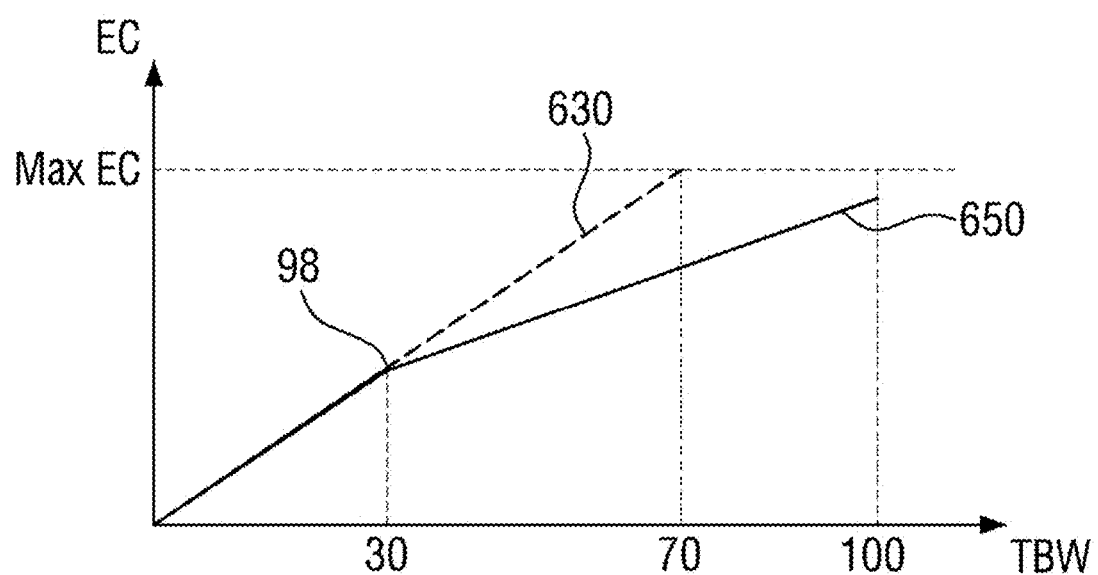

FIGS. 7 to 9 are diagrams for explaining the operating method of the memory controller according to the third embodiment of the present disclosure. In particular, FIGS. 7 to 9 explain a case where the analysis result is restricted. For convenience of explanation, points different from those explained using FIGS. 4 to 6 will be mainly explained.

Referring to FIG. 7, in operation S211, the host 200 provides the storage device 100 with a first state analysis request AR1 of the memory.

Subsequently, in operation S221, the storage device 100 performs the first state analysis of the memory in response to the first state analysis request AR1. Specifically, the storage device 100 determines the fragment state of the memory, and determines the lifespan situation of the memory.

As a result of the state analysis of the memory, the fragment state was fragmented (YES), and the lifespan situation was analyzed as bad (NO). Here, the lifespan situation analysis will be specifically explained referring to FIG. 8. Referring to FIG. 8, an x-axis is TBW (Total Byte Written), and a y-axis means an EC (erase count). It is assumed that the current state of memory is 30 TBW and the expected lifespan (guaranteed lifespan) is 100 TBW. Reference numeral 610 means a reference lifeline, and reference numeral 630 means a real lifeline.

If a slope after the determination time point (current state) (that is, after the write size 30 TBW) is the same as a slope before the determination time point (that is, the write size 0 to 30 TBW) at the real lifespan line 630, it is expected that the expected lifespan (guaranteed lifespan) of memory is not fulfilled. That is, because the slope of the real lifeline 630 is sufficiently steep, the number of erases reaches Max EC at about 70 TBW (before 100 TBW which is the expected lifespan). Therefore, the memory controller 150 determines the lifespan situation as bad (NO).

If the memory is fragmented and it is determined that the expected lifespan of memory does not fulfill the desired lifespan, a restriction section associated with the host write count (i.e., a host write size) is set. The host write count (i.e., host write size) means the data size that is written according to write request of the host.

The size of the restriction section may be set in advance. The size of the restriction section may be 30 TBW, regardless of severity of the lifespan situation.

Also, the size of the restriction section may be changed depending on severity of the lifespan situation (i.e., depending on the expected lifespan). For example, if the expected lifespan is 70% of the desired lifespan (that is, if the desired lifespan is 100 TBW but the expected lifespan is 70 TBW), the size of the restriction section may be 30 TBW. Also, if the expected lifespan is 60% of the desired lifespan, the size of the restriction section is 40 TBW, which may be an increased value over 30 TBW. If the expected lifespan is 80% of the desired lifespan, the size of the restriction section is 20 TBW, which may be a decreased value from 30 TBW.

For example, if the size of the restriction section is set to 30 TBW, because the determination time point is 30 TBW, the restriction section becomes 30 TBW to 60 TBW.

In operation S231, the storage device 100 provides the first analysis result RSP1 of the memory to the host 200. Since the memory is fragmented but the lifespan situation is bad, the first analysis result RSP1 may be "restrict by lifespan".

The host 200 receives and confirms the provision of the first analysis result RSP1 from the storage device 100, and the host 200 does not request the storage device 100 to perform the garbage collection.

Subsequently, after passage of some time, in operation S212, the host 200 may provide the storage device 100 with a second state analysis request AR2 of the memory.

In operation S222, the storage device 100 performs the second state analysis of the memory, in response to the second state analysis request AR2 of the memory. As a result of state analysis of the memory, the fragment state was fragmented (YES), and the lifespan situation was analyzed as bad (NO).

If the memory is fragmented and it is determined that the expected lifespan of memory does not fulfill the desired lifespan, the host write count is taken into further consideration. Further consideration of the host write count means determining whether the host write count is within the restriction section. As mentioned above, if the restriction section is 30 TBW to 60 TBW (that is, the size of the restriction section is 30 TBW) and the current state of memory is 40 TBW, because 40 TBW is within the restriction section, the second analysis result RSP2 may be "restrict by lifespan".

In operation S232, the storage device 100 provides the second analysis result RSP2 of the memory to the host 200.

The host 200 receives and confirms the second analysis result RSP2 from the storage device 100, and the host 200 does not request the storage device 100 to perform the garbage collection.

Subsequently, after passage of additional time, in operation S213, the host 200 may provide the storage device 100 with a third state analysis request AR3 of the memory.

In operation S223, the storage device 100 performs the third state analysis of the memory in response to the third state analysis request AR3 of the memory. As a result of the state analysis of the memory, the fragment state was fragmented (YES), and the lifespan situation was analyzed as bad (NO).

Since the memory was fragmented and it was determined that the expected lifespan of memory does not fulfill the desired lifespan, the host write count is taken into further consideration. If the restriction section is 30 TBW to 60 TBW and the current state of memory is 65 TBW, because 65 TBW is outside the restriction section, a third analysis result RSP3 in which the garbage collection is "required" is generated.

In operation S233, the storage device 100 generates a third analysis result RSP3 of the memory indicating that garbage collection is now "required" and provides it to the host 200.

In operation S240, the host 200 confirms the third analysis result RSP3, and provides a garbage collection execution request ER.

In operation S250, the storage device 100 executes the garbage collection GC.

In operation S260, the storage device 100 provides the host 200 with a garbage collection result ERSP indicating that the garbage collection GC is completed.

According to the operating method of the memory controller according to the third example embodiment of the present disclosure, because the garbage collection operation is restricted while the host write count is within the restriction section, the lifespan damage due to the garbage collection operation can be reduced.

For example, as shown in FIG. 9, if the garbage collection operation is not restricted, the slope is maintained as in reference numeral 630, and an expected lifespan becomes 70 TBW. On the other hand, it may be seen that, by restricting the garbage collection operation during the restriction section, the slope becomes small as in reference numeral 650, and the expected lifespan fulfills the desired lifespan 100 TBW.

Figure 10:
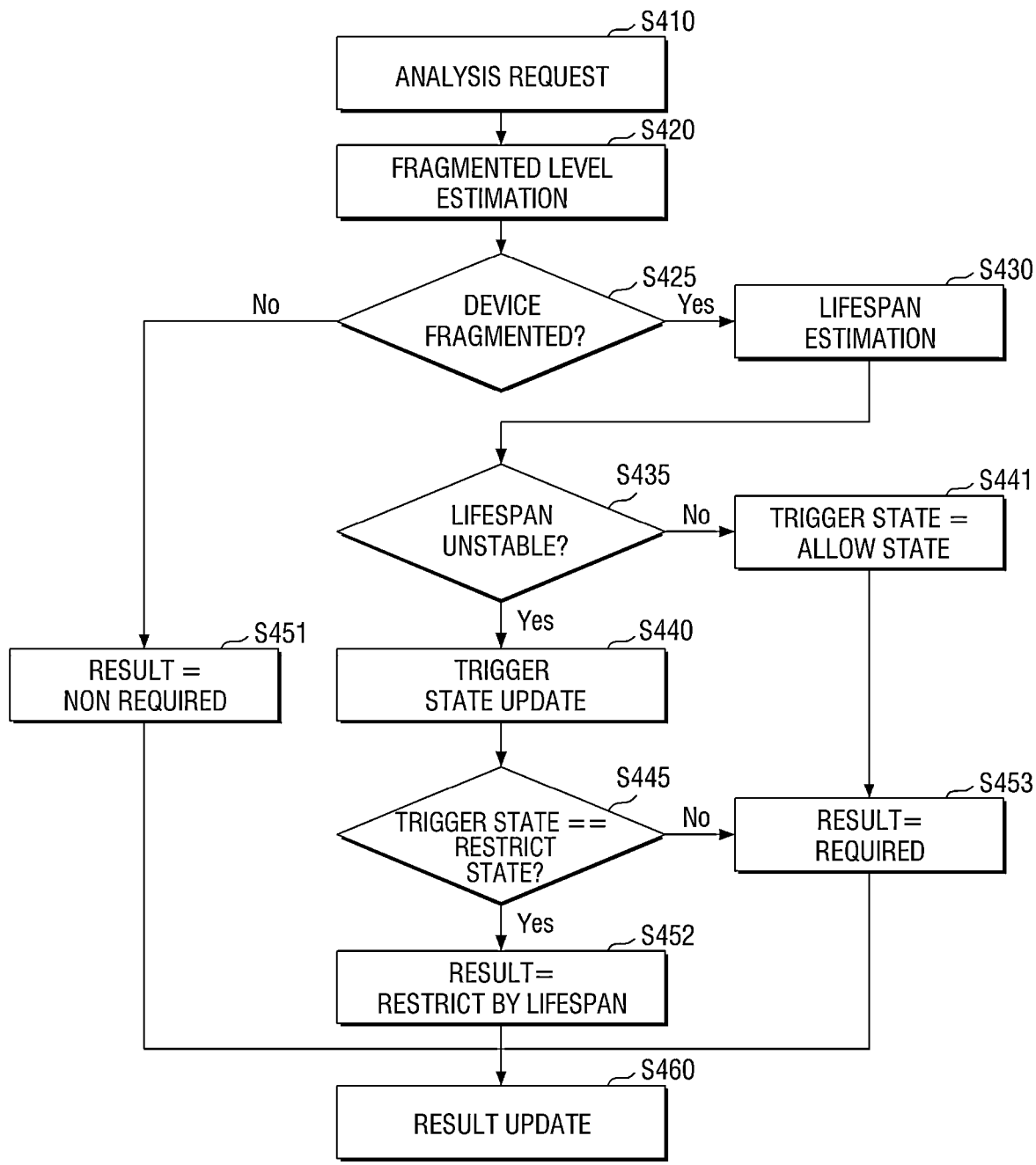
FIG. 10 is a flowchart for explaining an operating method of the memory controller according to a fourth example embodiment of the present disclosure.

FIG. 10 is a flowchart for explaining an operating method of a memory controller according to a fourth embodiment of the present disclosure. A process of deriving the analysis results RSP, RSP1 to RSP3 explained using FIGS. 4 to 9 will be explained using a flowchart.

Referring to FIG. 10, in operation S410, a state analysis request is provided from the host 200.

In operation S420, the memory controller 150 predicts a fragmented level (or a fragment state).

In operation S425, the memory controller 150 determines whether the memory is fragmented.

In operation S451, if the memory controller 150 determines that the memory is not fragmented (No), the analysis result RSP becomes "non-required" of garbage collection, and the memory controller 150 proceeds to update the results in operation S460, discussed infra.

On the other hand, in operation S430, if the memory controller 150 determines that the memory is to be fragmented (Yes), the lifespan situation of the memory (that is, an expected lifespan) is predicted.

In operation S435, the memory controller 150 determines whether the lifespan situation is stable.

In operation S441, when the memory controller 150 determines that the lifespan situation is stable (No in operation S435), a trigger state trigger state is changed to an allow state, and thereafter, in operation S453, the memory controller 150 sets the analysis result RSP to indicate "required" of the garbage collection.

On the other hand, in operation S440, when the memory controller 150 determines that the lifespan situation is unstable (Yes in operation S425), the memory controller 150 updates the trigger state. Updating of the trigger state is based on whether the host write count is within the restriction section. If the host write count is within the restriction section, the trigger state is updated to the restriction section. If the host write count is outside the restriction section, the trigger state is not updated to the restrict state.

In operation S445, the memory controller 150 determines whether the updated trigger state is a restrict state.

In operation S453, if the trigger state is not a restrict state (No in operation S445), the memory controller 150 updates the analysis result RSP to indicate "required" of the garbage collection.

In contrast, in operation S452, if the trigger state is the restrict state (Yes in operation S445), the memory controller 150 updates the analysis result RSP to indicate "restrict by lifespan".

In operation S460, the memory controller 150 provides the analysis results to the host 200, where the analysis result may be non-required (S451), required (S453) or update (S460).

Figure 11:
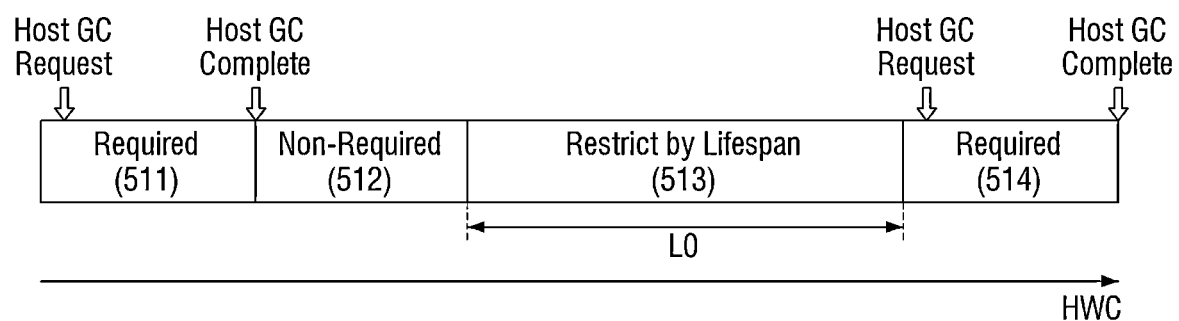
FIGS. 11 and 12 are diagrams for explaining the operating method of the memory controller according to the fourth example embodiment of the present disclosure.
Figure 12:
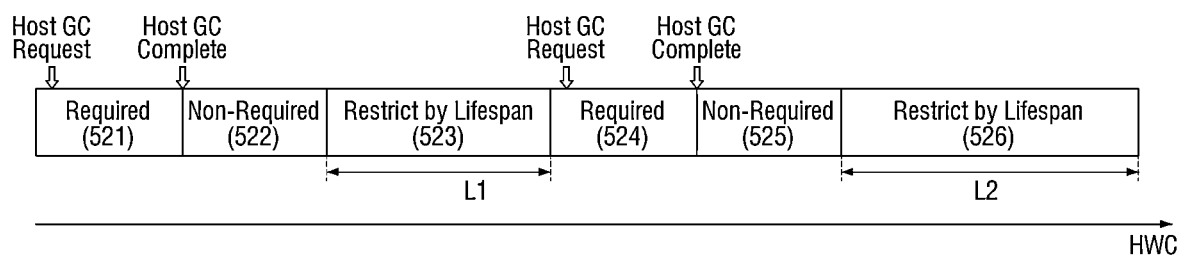

FIGS. 11 and 12 are diagrams for explaining an operating method of a memory controller according to a fourth example embodiment of the present disclosure.

Referring to FIG. 11, an x-axis indicates a host write count HWC. FIG. 11 shows the state of the memory as the host write count is performed.

A host-initiated garbage collection may be performed in a section in which the memory state is "required" (see reference numeral 511).

Subsequently, after the host-initiated garbage collection is completed, the state of memory may be "non-required" during a given host write count (see reference numeral 512).

Subsequently, after a given host write count is performed without a garbage collection, the memory may become fragmented, but the lifespan situation of memory may be unstable, and, thus, and the memory state may be restricted "(restrict by lifespan)" (see reference numeral 513). As explained using FIG. 7, when the host write count is located within a desired (or, alternatively, a preset) restriction section, the memory state becomes "restrict (restrict by lifespan)". The size of the restriction section is shown as L0.

Subsequently, if the host write count exceeds the desired (or, alternatively, the preset) restriction section L0, the memory state becomes "required" again (see reference numeral 514).

Referring to FIG. 12, the host-initiated garbage collection is performed at the section in which the memory state is "required" (see reference numeral 521). Subsequently, after the host-initiated garbage collection is completed, the memory state becomes "non-required" (see reference numeral 522). Subsequently, after a given host write count is performed without a garbage collection, the memory is fragmented, but the lifespan of memory is unstable, and, thus, the memory state may be "restricted (restrict by lifespan)" (see reference numeral 523).

Subsequently, if the host write count exceeds a desired (or, alternatively, a preset) restriction section L0, the memory state becomes "required" again (see reference numeral 524). Subsequently, after the host-initiated garbage collection is completed, the state of memory becomes "non-required" (see reference numeral 525). Subsequently, after a given host write count is performed without a garbage collection, the memory was fragmented, but the lifespan of memory is unstable and the memory state may be "restricted (restrict by lifespan)" (see reference numeral 526).

On the other hand, a size L1 of the restriction section 523 and a size L2 of the restriction section 526 are different from each other. As shown, the size L2 of the restriction section 526 may be larger than the size L1 of the restriction section 523.

That is, as the host write count increases, the lifespan situation of memory may gradually worsen. Therefore, if the host write count is relatively low, the size of the restriction section (i.e., see the restriction section 523) may be decreased, and if the host write count is relatively large, the size of the restriction section may be increased (i.e., see the restriction section 526). When increasing the size of the restriction section, it is possible to reduce an occurrence frequency of host-initiated garbage collection. Therefore, the lifespan damage of the memory due to garbage collection can be reduced.

Figure 13:
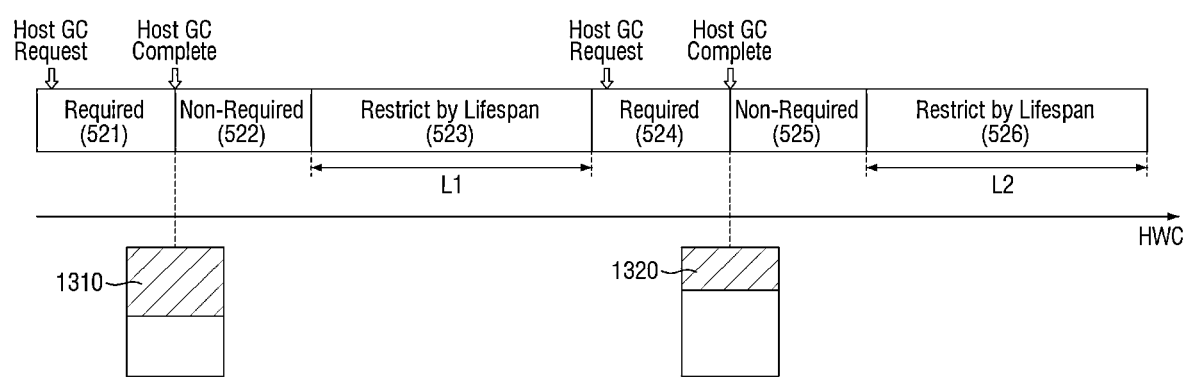
FIG. 13 is a diagram for explaining an operating method of the memory controller according to a fifth example embodiment of the present disclosure.

FIG. 13 is a diagram for explaining an operating method of a memory controller according to a fifth example embodiment of the present disclosure. For convenience of explanation, points different from those explained using FIG. 12 will be mainly explained.

Referring to FIG. 13, as the host write count HWC increases, the state of memory may repeat required 521, non-required 522, restricted 523, required 524, non-required 525, and restricted 526. At the section in which the memory state is "required 521", the host-initiated first garbage collection is performed, and at the section in which the memory state is "required 524", the host-initiated second garbage collection is performed.

On the other hand, a size of a memory region 1310 at which the first garbage collection is performed may be different from a size of a memory region 1320 at which the second garbage collection is performed.

As the host write count increases, the lifespan situation of memory may gradually worsen. Therefore, if the host write count is relatively low, the size of the garbage-collected memory region may be increased (that is, see the memory region 1310), and if the host write count is relatively large, the size of the garbage-collected memory region may be reduced (that is, see memory region 1320). By reducing the size of the garbage-collected memory region, it is possible to reduce the memory region in which lifespan is impaired.

Figure 14:
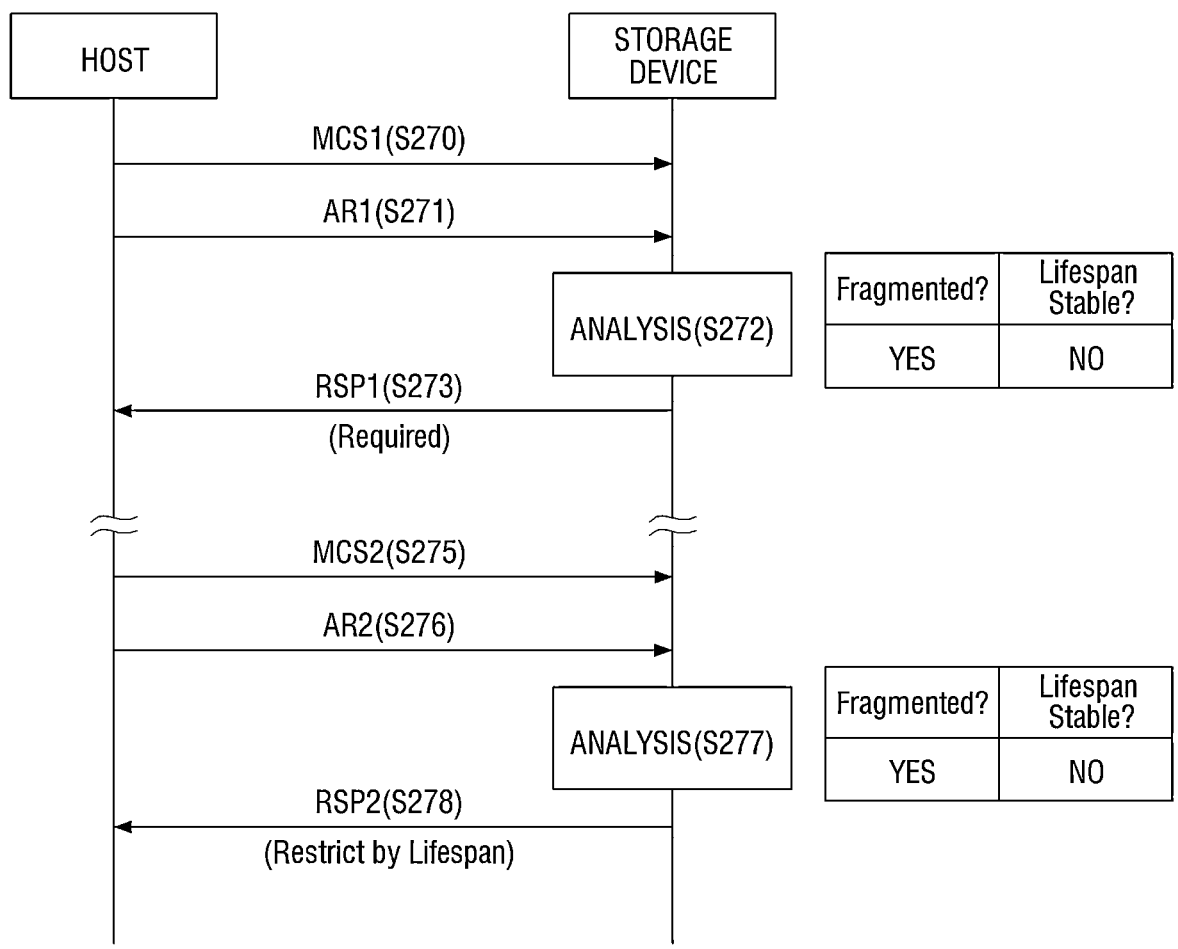
FIG. 14 is a diagram for explaining an operating method of the memory controller according to a sixth embodiment of the present disclosure.

FIG. 14 is a diagram for explaining an operating method of a memory controller according to a sixth embodiment of the present disclosure.

Referring to FIG. 14, the host 200 may provide mode control signals MCS1 and MCS2 to the memory controller 150 to perform mode conversion associated with the garbage collection.

Specifically, in operation S270, the host 200 may provide a first mode control signal MCS1 to the storage device 100. The storage device 100 is in a first mode (e.g., a performance mode) according to the first mode control signal MCS1.

Subsequently, in operation S271, the host 200 may provide a first state analysis request AR1 to the storage device 100.

In response thereto, in operation S272, the storage device 100 analyzes the state of the memory. For example, based on a result of the analysis, the storage device 100 may determine that the memory is fragmented and the expected lifespan of memory is expected not to fulfill the desired lifespan. Since there is a first mode in which performance is prioritized over lifespan of the memory, even if the expected lifespan of memory is determined not to fulfill the desired lifespan, the first analysis result RSP1 indicates required.

In operation S273, the storage device 100 provides the first analysis result RSP1 to the host 200. Although not shown separately, a host-initiated garbage collection will be performed later.

In operation S272, the host 200 may provide a second mode control signal MCS2 to the storage device 100. The storage device 100 may be in a second mode (e.g., a lifespan mode) according to the second mode control signal MCS2.

Subsequently, in operation S276, the host 200 may provide a second state analysis request AR2 to the storage device 100.

In response thereto, in operation S277, the storage device 100 analyzes the state of the memory. For example, the storage device 100 may determine that the memory is fragmented, and the expected lifespan of memory not to fulfill the desired lifespan. Since there is a second mode in which lifespan is prioritized over performance of the memory, even if the memory is determined to be fragmented, the second analysis result RSP2 indicates restrict (restricted by lifespan).

Although FIG. 14 explains that a second mode is performed after the first mode, the second mode may be performed earlier and the first mode may be performed later.

Those skilled in the art will appreciate that many variations and modifications can be made to the example embodiments without substantially departing from the principles of the example embodiments. Therefore, the disclosed example embodiments of the inventive concepts are used in a generic and descriptive sense only and not for purposes of limitation.

What is claimed is:

1. A method of operating a memory controller, the method comprising:
   receiving a state analysis request of a memory from a host;
   determining a fragment state of the memory;
   determining a desired lifespan of the memory;
   determining an expected lifespan of the memory;
   determining a restriction section of the memory based on a difference between the desired lifespan and the expected lifespan of the memory;
   generating an analysis result indicating garbage collection is restricted based on the fragment state and a host write count being within the restriction section;
   providing the analysis result to the host;
   receiving a garbage collection execution request from the host, in response to providing the analysis result to the host; and
   performing a garbage collection operation on a garbage-collected memory region of the memory, in response to the garbage collection execution request.

2. The method of claim 1, wherein generating the analysis result further comprises:
   generating the analysis result such that the analysis result indicates that the garbage collection is required, in response to the host write count exceeding the restriction section.

3. The method of claim 1, further comprising:
   adjusting a size of the restriction section based on the expected lifespan of the memory.

4. The method of claim 1, wherein generating the analysis result comprises:
   generating the analysis result that the analysis result indicates the garbage collection is not required, in response to the fragment state of the memory being below a fragmentation threshold.

5. The method of claim 1, further comprising:
   adjusting a size of the garbage-collected memory region based on the expected lifespan of the memory.

6. The method of claim 1, further comprising:
   providing the host with the fragment state and the expected lifespan.

7. The method of claim 1, wherein the determining the expected lifespan comprises:

calculating an expected lifespan based on a Write Amplification Factor (WAF).

8. The method of claim 1, further comprising:
receiving a mode control signal from the host, and wherein the generating the analysis result comprises:
generating the analysis result based on the fragment state and the expected lifespan, in response to the mode control signal indicating a first mode, and
generating the analysis result based on the fragment state without consideration of the expected lifespan, in response to the mode control signal indicating a second mode.

9. The method of claim 1, wherein the memory is included in one of an eMMC (embedded multimedia card), a UFS (universal flash storage) or a SSD (solid state drive).

10. A method of operating a memory controller, the method comprising:
receiving a first state analysis request of a memory from a host;
providing a first analysis result of the memory to the host, in response to the first state analysis request;
receiving a first garbage collection execution request of the memory from the host;
performing a garbage collection operation on a first memory region of the memory, the first memory region being a first size;
receiving a second state analysis request of the memory from the host after performing the garbage collection operation on the first memory region;
providing a second analysis result of the memory to the host, in response to the second state analysis request, the second analysis result indicating that the garbage collection operation on the memory is restricted;
receiving a third state analysis request of the memory from the host after providing the second analysis result to the host;
providing a third analysis result of the memory to the host, in response to the third state analysis request;
receiving a third garbage collection execution request of the memory from the host; and
performing the garbage collection operation on a second memory region of the memory, the second memory region being a second size different from the first size of the first memory region.

11. The method of claim 10, wherein the second size is smaller than the first size.

12. The method of claim 10, further comprising:
generating the second analysis result such that the second analysis result indicates that the garbage collection operation is restricted, in response to the memory being fragmented, an expected lifespan of the memory is determined not to fulfill a desired lifespan, and a host write count is within a restriction section.

13. A storage device comprising:
a memory; and
a memory controller configured to,
determine a fragment state, a desired lifespan and an expected lifespan of the memory in response to a state analysis request from a host,
determine a restriction section of the memory based on a difference between the desired lifespan and the expected lifespan of the memory,
generate an analysis result indicating garbage collection is restricted based on the fragment state and a host write count being within the restriction section,
receive a garbage collection execution request from the host, in response to providing the analysis result to the host, and
perform a garbage collection operation on a garbage-collected memory region of the memory, in response to the garbage collection execution request.

14. The storage device of claim 13, wherein the memory controller is configured to generate the analysis result such that the analysis result indicates that the garbage collection is required, in response to the host write count being outside the restriction section.

15. The storage device of claim 14, wherein the memory controller is configured to adjust a size of the restriction section based on the expected lifespan of the memory.